United States Patent [19]

Vaughn et al.

[11] 4,175,762
[45] Nov. 27, 1979

[54] SULKY

[76] Inventors: Damon A. Vaughn, 525 N. Main St.; Herbert F. Hoffman, 336 S. Main St., both of Henderson, Ky. 42420

[21] Appl. No.: 871,196

[22] Filed: Jan. 23, 1978

[51] Int. Cl.² .............................................. B62C 1/08
[52] U.S. Cl. .................................................... 280/78
[58] Field of Search ............... 280/78, 204, 43.1, 652, 280/47.3, 47.32, 63

[56] References Cited

U.S. PATENT DOCUMENTS

| | | | |
|---|---|---|---|
| 495,015 | 4/1893 | Bull | 280/63 |
| 563,364 | 7/1896 | Engels | 280/63 |
| 579,176 | 3/1897 | Peardon | 280/63 |

FOREIGN PATENT DOCUMENTS

| | | | |
|---|---|---|---|
| 2302898 | 10/1976 | France | 280/78 |
| 445948 | 3/1949 | Italy | 280/78 |

Primary Examiner—Joseph F. Peters, Jr.
Assistant Examiner—Milton L. Smith
Attorney, Agent, or Firm—Warren D. Flackbert

[57] ABSTRACT

A sulky characterized by a single supporting wheel positioned behind, or partly beneath, the frame of the sulky, and where the driver's seat is positioned behind the single supporting wheel for added weight concentration and better driving control. The frame has a generally U-shaped plan configuration, unlike the present bow shape, and is typically made from a light weight metal which decreases in vertical dimension in a direction towards the head of the pulling horse.

5 Claims, 3 Drawing Figures

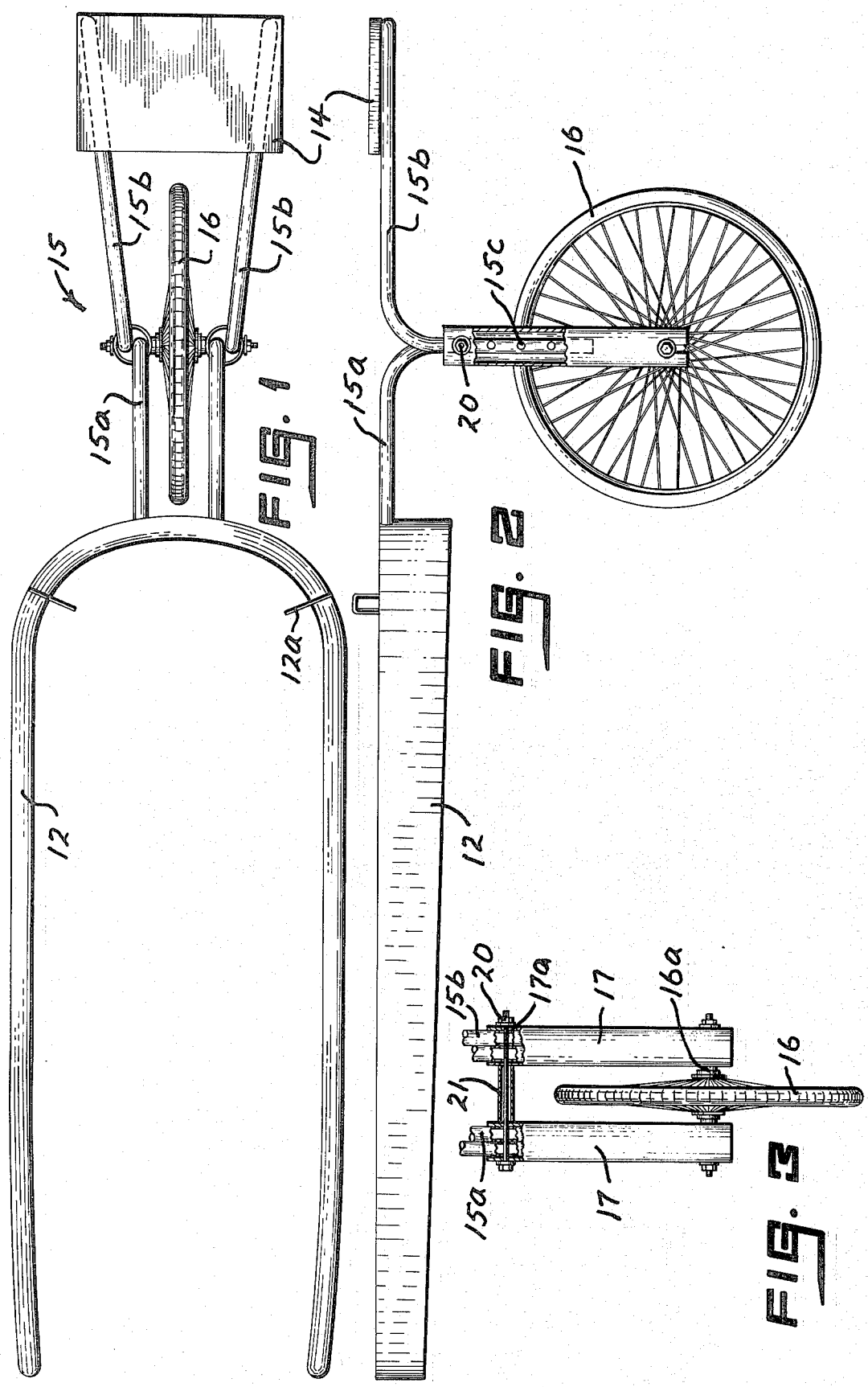

SULKY

As is known, trotting racing, utilizing horse drawn sulkies, is a widespread pleasurable pasttime, both for spectators and owners. Sulkies mainly in use involve two supporting wheels, such positioned on either side of the driver's seat. In this connection, and in usual arrangements, the supporting wheels extend beneath the frame of the sulky and the driver's seat is positioned in an area generally above the axis of the supporting wheels.

Moreover, the framework of the typical sulky represents, in plan configuration, an elongated bow shaped member, i.e. so curved as to extend around the rump of the horse and angling forwardly and inwardly for a straight distance on either side of the horse, and then connecting with the harness of the horse. Mostly, the frame has been a tubular member or, perhaps, multiple interconnected tubular members.

An objection to the sulkies currently in use is the unbalance in weight due to the position of the driver; the inability to accommodate the sulky to horses of different heights; the weight of the frame and the inability of the frame to conform to the shape of the horse; and, importantly, the danger of the horse, through its outwardly thrusting leg action during racing, to come into contact with the wheels generally proximate the outside back ends of the frame.

The invention overcomes the preceding objections by providing a single wheeled sulky, where such is positioned in the area between the legs of the horse. Important weight and balance is achieved by positioning the driver's seat behind the single supporting wheel. Additionally, means are provided for raising or lowering the frame of the sulky to accommodate horses of different heights.

Moreover, the frame itself presents an important improvement, in plan configuration, considering the adaption thereof to the shape of the horse, and the fact that such is made from an integrally formed lightweight material, such as aluminum. Further in this connection, the frame, assuming a smooth curved or blended U-shape plan configuration, tapers from a greater vertical dimension at the supporting wheel of the sulky to a lesser vertical dimension at the front of the frame, i.e. near the shoulders of the horse.

The invention provides stability and versatility for individual mounting requirements. Danger of interference with the supporting wheel is eliminated because the wheel is disposed between the sides of the frame, i.e. the possibility of interference with the legs of the moving animal is mostly precluded. Importance lies with the fact that the driver's seat is behind the supporting wheel, affording stability because of desired weight concentration. In addition, the invention presents a unit which is readily assembled, as well as easily adapted to existing harness for the driving animal.

A better understanding of the present invention will become more apparent from the following description, taken in conjunction with the accompanying drawing, wherein FIG. 1 is a top plan view of a sulky in accordance with the teachings of the present invention;

FIG. 2 is a view in elevation, looking from bottom to top in FIG. 1, showing other details of the invention; and, FIG. 3 is a fragmentary view, looking, for example, from right to left in FIG. 2, showing still further details of the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications of the illustrated device and such further applications of the principles of the invention as illustrated therein being contemplated as would normally occur to one skilled in the art to which the invention relates.

Referring now to FIGS. 1, 2 and 3, the sulky in accordance with the invention comprises a frame 12 receiving and partly surrounding a driving horse, and a driver's seat 14 mounted on an assembly 15 which positions a supporting wheel 16 for both the frame 12 and the driver's seat 14. Typically, the frame 12 and the assembly 15 are made from lightweight material, such as aluminum, where the single supporting wheel 16 is conventionally spoked and rubber tired.

The supporting wheel 16 is rotatably mounted on an axle 16a which extends through and is bolted to upstanding hollow tubular members 17. The assembly 15, unitary with frame 12, includes rearwardly disposed tubular members 15a which extend downwardly into the hollow tubular members 17. The driver's seat 14 is also positioned on tubular members 15b which extend forwardly and then downwardly into the hollow tubular members 17. Typically, the downwardly extending portions of tubular members 15a and 15b are brazed together and include spaced-apart openings 15c therethrough, the latter selectively aligning with openings 17a through hollow tubular members 17.

In order to assemble the combined frame 12 and driver's seat 14, the downwardly extending portions of the tubular members 15a and 15b are received within the hollow tubular members 17, where nut and bolt means 20, extending through a spacer 21, permit the adjustment to any of the openings 15c and 17a. The latter plays importance in accommodating horses of different heights.

As stated heretofore, the significance of the invention lies in the fact that the single supporting wheel 16 is disposed behind the frame 12, or, at least, has only a small portion thereof positioned beneath the rear portion of the frame 12. Additionally, another significant factor is the position of the driver's seat 14 behind the single supporting wheel 16. Restated, the latter provides an important concentration of driver's weight and, further, affords stability to the unit.

Importance also lies in the fact that the single supporting wheel 16 is positioned between the legs of the horse, eliminating, to a very large extent, the possibility of the horse's legs coming into contact with the supporting wheel during racing. As stated, in present sulkies, the two supporting wheels are typically positioned proximate the area of the horse's rear legs, creating danger during racing.

As to the frame 12, such typically is formed from lightweight metal material in the form of a rounded or gently curved U-shaped plan configuration, in contrast to the present bow shape. The frame 12 supports conventional stirrups 12a, as shown in FIGS. 1 and 2. Referring further to the latter figures, it will be observed that the front ends of the frame 12 bulge or angle slightly inwardly toward the sides of the horse's body, where the overall configuration adapts to the contour of the horse and affords more riding convenience.

Additionally, and as particularly evident in FIG. 2, the frame 12 has its greatest vertical dimension at the rear thereof, i.e. toward the single supporting wheel 16, and then tapers to a thinner dimension in the direction of the head of the horse. In other words, a lightweight frame 12 is achieved, but, yet, one which readily concentrates weight toward the driver and also adapts to existing harness for the sulky horse.

In any event, and from the preceding, it should be apparent that the sulky defining the invention presents numerous advantages in trotting races, including the weight distribution and stability afforded by the position of the driver behind the single supporting wheel; the fact that only one supporting wheel is involved, meaning less chance for obstruction or any possible interference with the legs of the trotting horse; the presence of less ground resistance; the minimizing of bind and friction during turning; the prevention of wheel interlocking; the adjustability, in a vertical direction, of the frame and driver's seat to accommodate the height of a horse; and, the lightweight and body conforming frame which is readily received by existing harness for the trotting horse.

In other words, the modified sulky of the invention provides a significant breakthrough for achieving optimum trotting performance for the owner's horse, as well as more exciting performance for the spectator.

The above-described sulky is susceptible to various changes within the spirit of the invention, as, for example, in proportioning, including the diameter of the wheel; the particular arrangement for achieving vertical adjustment for accommodating the height of the horse; the degree of taper or inward bulge of the side portions of the frame; and, the like. Thus, the preceding description should be considered illustrative and not as limiting the scope of the following claims:

We claim:

1. A sulky comprising a frame adapted to receive and partly surround an animal, a single wheel supporting said frame, and a seat for the driver of the sulky disposed on said frame and positioned behind said single wheel in a direction opposite to the path of movement of the sulky, where said frame and said driver's seat are integral and vertically adjustable with respect to said single wheel through supporting structure which extends downwardly and is received in hollow cylinders on which said single wheel is rotatably positioned.

2. The sulky of claim 1 where said single supporting wheel is positioned behind said frame.

3. The sulky of claim 1 where said frame is continuous and has a vertical dimension which decreases in a direction toward the path of movement of the sulky.

4. The sulky of claim 1 where said frame has two side portions and a curved rear portion defining a generally U-shaped plan configuration, and where said single wheel is mounted at the middle of said curved rear portion.

5. A sulky comprising a frame adapted to receive and partly surround an animal, a single wheel supporting said frame, and a seat for the driver of the sulky disposed on said frame and positioned behind said single wheel in a direction opposite to the path of movement of the sulky, where said frame and said driver's seat are integral and vertically adjustable with respect to said single wheel through cooperating supporting structures movable relative to each other in a telescopic relationship, one structure mounting said integral frame and driver's seat and another structure rotatably positioning said single wheel.

* * * * *